(12) United States Patent
Heilfort et al.

(10) Patent No.: US 10,190,665 B2
(45) Date of Patent: Jan. 29, 2019

(54) DRIVE SYSTEM FOR A VEHICLE, AND VEHICLE

(71) Applicant: Dr. Ing. h.c. F. Porsche Aktiengesellschaft, Stuttgart (DE)

(72) Inventors: Falk Heilfort, Eberdingen (DE); Axel Heitmann, Ditzingen (DE); Wael Mohamed, Hemmingen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/748,297

(22) Filed: Jun. 24, 2015

(65) Prior Publication Data

US 2016/0003333 A1 Jan. 7, 2016

(30) Foreign Application Priority Data

Jul. 4, 2014 (DE) .................. 10 2014 109 379

(51) Int. Cl.
| | |
|---|---|
| *F16H 48/30* | (2012.01) |
| *F16H 3/72* | (2006.01) |
| *F16H 37/02* | (2006.01) |
| *B60K 1/00* | (2006.01) |
| *F16H 37/08* | (2006.01) |
| *F16H 3/46* | (2006.01) |

(52) U.S. Cl.
CPC .............. *F16H 37/08* (2013.01); *B60K 1/00* (2013.01); *F16H 3/46* (2013.01); *B60K 2001/001* (2013.01)

(58) Field of Classification Search
CPC ........ F16H 37/08; F16H 3/46; F16H 37/0826; F16H 37/082; B60K 6/50
See application file for complete search history.

(56) References Cited

U.S. PATENT DOCUMENTS

| | | | | |
|---|---|---|---|---|
| 2008/0058145 | A1* | 3/2008 | Holmes ................. | B60K 6/445 475/5 |
| 2010/0210388 | A1* | 8/2010 | Grochowski .......... | B60K 6/365 475/5 |
| 2011/0011655 | A1* | 1/2011 | Venturi ................... | B60K 6/36 180/65.22 |
| 2011/0195811 | A1 | 8/2011 | Huelsemann | |
| 2013/0130857 | A1 | 5/2013 | Gassmann | |
| 2013/0190124 | A1* | 7/2013 | Gassmann .............. | B60K 1/00 475/150 |

FOREIGN PATENT DOCUMENTS

| | | |
|---|---|---|
| DE | 42 06 086 | 9/1993 |
| DE | 10 2010 007 638 | 8/2011 |
| DE | 11 2010 005 738 | 6/2013 |
| DE | 10 2012 220 971 | 5/2014 |

OTHER PUBLICATIONS

German Search Report dated Mar. 3, 2015.

* cited by examiner

*Primary Examiner* — Ramya P Burgess
*Assistant Examiner* — Lillian T Nguyen
(74) *Attorney, Agent, or Firm* — Gerald E. Hespos; Michael J. Porco; Matthew T. Hespos

(57) ABSTRACT

A drive system for a vehicle has a drive motor and an axle. A driving torque generated by the drive motor is transmitted via a gear chain and a planetary transmission to the axle. The drive system can be assembled modularly, and wherein the planetary transmission is coordinated with the drive motor to determine an overall transmission ratio.

11 Claims, 2 Drawing Sheets

DRIVE SYSTEM FOR A VEHICLE, AND VEHICLE

CROSS REFERENCE TO RELATED APPLICATION

This application claims priority under 35 USC 119 to German Patent Appl. No. 10 2014 109 379.8 filed on Jul. 4, 2014, the entire disclosure of which is incorporated herein by reference.

BACKGROUND

1. Field of the Invention

The invention relates to a drive system for a vehicle and to a vehicle with a drive system.

2. Description of the Related Art

Drive systems that transmit a torque from a drive motor to a wheel axle are well known. DE 42 06 086 A1 discloses a drive system that can be assembled modularly to adapt the drive system to vehicles that are motorized in different ways and that differ, for example, with regard to the drive motor. Modular drive systems can be assembled from a relatively small inventory of standard component types and hence can be produced economically.

Meeting desired quality requirements, for example with respect to efficiency of the transmission ratio in a transmission of the drive system, can be difficult in a drive system that is assembled modularly.

It is an object of the invention to provide a drive system which can be assembled modularly and that has as many identical parts as possible and at the same time is capable of transmitting the driving torque to the axle in as optimum a manner as possible.

SUMMARY OF THE INVENTION

A drive system for a vehicle in accordance with the invention has a drive motor and an axle. A driving torque generated by the drive motor is transmitted via a gear chain and a planetary transmission to the axle. The drive system can be assembled modularly, and the planetary transmission is coordinated with the drive motor to determine an overall transmission ratio.

The drive system of the invention has the advantage over the prior art in that all parts of the drive system, other than the planetary transmission and the drive motor, can always be assembled from the same standardized modular components. Suitable selection of the planetary transmission enables the overall transmission ratio to be fine-tuned and advantageously coordinated with the respective drive motor. As a result, the drive system has as many identical parts as possible without reducing the quality of the assembled drive system. In particular, the drive system permits great flexibility in the configuration of the entire system with a high portion of identical parts.

The axle preferably is a wheel axle and the drive system may be used for the front wheel drive of the vehicle. The drive system may be for plural different vehicles, including vehicle models that are motorized in different ways and that may have different drive motors. The individual drive motors may differ with regard to size and/or with regard to power capacity. Furthermore, a high torque for the wheels may be generated only by the planetary transmission. In particular, the planetary transmission may generate the high torque only at the axle. A variable set of planetary transmissions may be provided for the drive systems for fine tuning the planetary transmission with the drive motor.

The gear chain may be determined independently of the drive motor and the planetary transmission. That is to say, the gear chain remains the same for a multiplicity of drive systems. In particular, a first transmission for all of the drive systems is determined by the selected or determined gear chain, as a result of which the overall transmission ratio can be set unambiguously in an advantageous manner by the planetary transmission and can thus be adapted to certain specifications of the drive motor.

The driving torque may be transmitted by the planetary transmission via a differential, i.e. differential gear, to the axle. The differential may be connected directly downstream of the planetary transmission. The differential may be a spur gear differential and advantageously ensures that torque is distributed to the wheels.

A drive axle of the drive motor may run substantially parallel to the wheel axle. In particular, a distance between the axle and the drive axle may be comparatively small and/or defined by the dimensioning of the drive motor. The drive motor may be directly adjacent to the axle in a direction running substantially perpendicular to the axle. As a result, small torques of the drive motor can be transformed advantageously over comparatively small distances to the axle.

The gear chain may comprise an uneven number of spur gears. Thus, the direction of rotation of the drive motor is maintained. In particular, the gear chain may comprise three spur gears that are connected one behind another. The axes of rotation about which the spur gears rotate are oriented substantially parallel to the axle or to the drive axle and are arranged in a common plane. Furthermore, the individual spur gears may differ with regard to their diameters.

A final spur gear of the gear chain may be coupled to a sun gear of the planetary transmission. Thus, the driving torque transmitted by the gear chain can be transmitted directly to the planetary transmission. The sun gears of all potentially usable planetary transmissions may be adapted to the final spur gear.

The drive system may have a decoupling device. In particular, the axle may be uncoupled from the remainder of the drive system if a rotational speed of the wheels or an overall efficiency leaves a corresponding tolerance range. Permanent operability of the drive system can thereby be ensured.

A primary spur gear may be smaller in diameter than the final spur gear.

The drive motor may be an electric motor and the drive system may be integrated into an electric vehicle or hybrid vehicle. For example, the vehicle may be a battery-powered vehicle or a plug-in vehicle and the planetary transmission may be adapted to such a use.

The invention further relates to a vehicle that has an embodiment of the above-described drive system. Compared to the prior art, during the production of such a vehicle, recourse can be made to a drive system that has a large batch of identical parts and at the same time permits great flexibility in the configuration of the entire system.

Further details, features and advantages of the invention emerge from the drawings and from the description below of preferred embodiments with reference to the drawings. The drawings here merely illustrate exemplary embodiments of the invention which do not restrict the essential inventive concept.

DETAILED DESCRIPTION

Figure 1A:
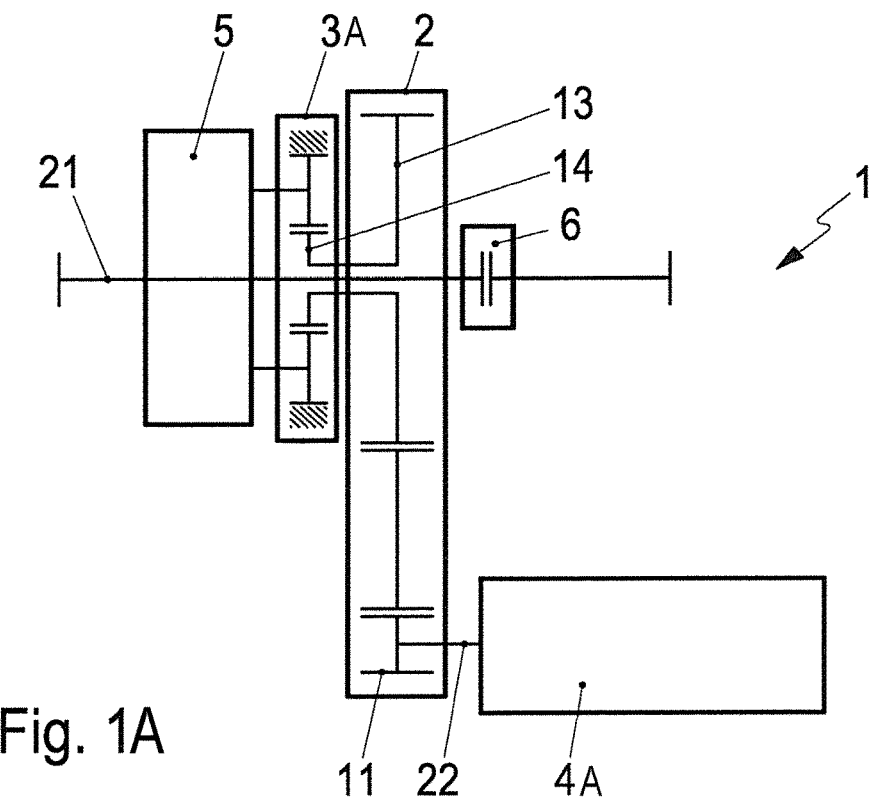
FIGS. 1A and 1B are block illustrations of two variations of a drive system according to an embodiment of the invention.
Figure 1B:
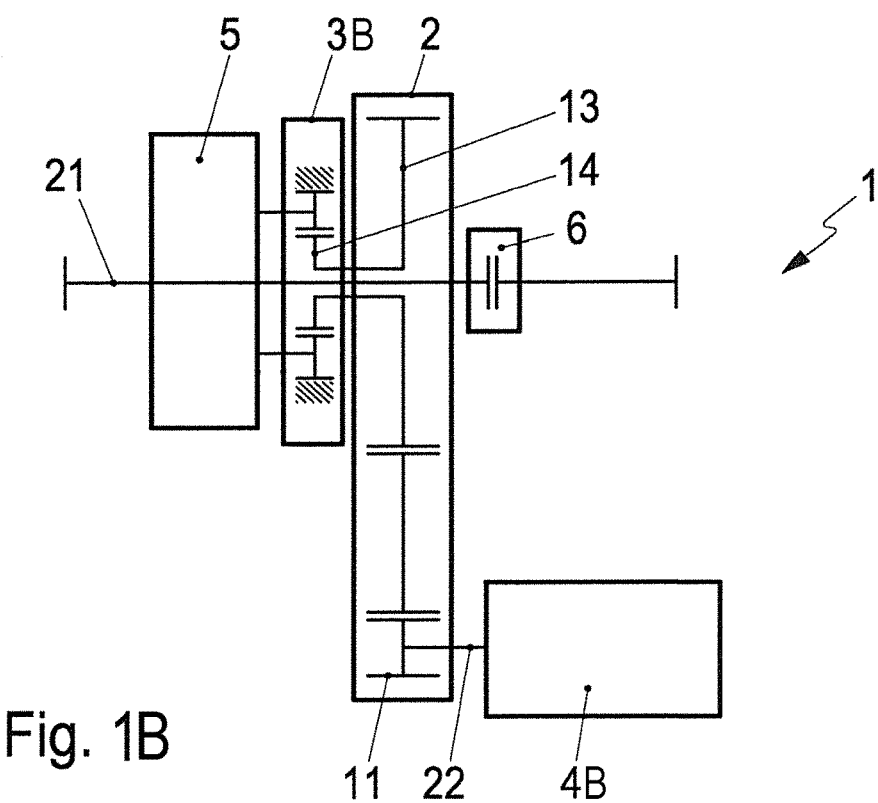

FIGS. 1A and 1B schematically illustrates two versions of a drive system 1 according to an embodiment of the invention. Each drive system 1 has a drive motor 4A or 4B that transmits a driving torque to a wheel axle 21. The drive motor 4A or 4B preferably is an electric motor, the rotor of which preferably is parallel to the axle, and the drive system 1 is integrated into an electric vehicle or hybrid vehicle. The drive system 1 may be for a front wheel drive of a vehicle and can be assembled modularly. In addition to the axle 21 and the drive motor 4, the modules may comprise a gear chain 2, a planetary transmission 3A or 3B and a differential 5, in particular a spur gear differential. The gear chain 2 in the illustrated embodiments comprises three spur gears arranged next to one another. The axes of rotation about which the spur gears rotate may be substantially in one plane and may be parallel to the axle 21. A primary spur gear 11 preferably absorbs the driving torque directly from the drive motor 4A or 4B by being connected directly and for conjoint rotation to a drive axle 22 of the drive motor, for example to the rotor thereof. The gear chain 2 is determined as a standardized component of both of the drive system 1 and remains identical even for the different drive motors 4A or 4B. It is conceivable, for example, for the drive system 1 to be installed in different motorized vehicles having different drive motors 4A or 4B in each case. The gear chain 2 then preferably remains identical for a multiplicity of different vehicles, in particular different vehicle models, while the drive motors 4A or 4B change for at least some of the different vehicles. The drive motors 4A and 4B differ with regard to the size and power capacity thereof.

The drive axle 22 and the wheel axle 21 may be offset and parallel to each other, with the distance between the wheel axle 21 and the drive axle 22 is determined by the gear chain 2. Preferably, an axis of rotation about which the primary spur gear 11 rotates runs along the drive axle 22 and an axis of rotation about which a final spur gear 13 of the gear chain 2 rotates runs along the wheel axle 21. It is conceivable here for the primary spur gear 11 to be smaller in diameter than the final spur gear 13. Then, during operation of the drive system 1A or 1B, the driving torque is transmitted from the primary spur gear 11 to the final spur gear 13. The final spur gear 13 is coupled to a sun gear 14 of the planetary transmission 3A or 3B. The overall transmission ratio depends on the transmission ratio of the gear chain 2 and the planetary transmission 3. By determining a defined gear chain 2 that is configured identically for plural drive systems 1A and 1B with different drive motors 4A and 4B, the overall transmission ratio of the drive system 1 is defined by the planetary transmission 3A or 3B. In particular, a high driving torque for the wheels is generated only by the planetary transmission directly at the axle 21. The overall transmission ratio then advantageously can be determined by the selection of the suitable planetary transmission and can be adapted to the respective drive motor 4A or 4B. The optimum setting for the respective drive system 1 can be determined by a suitable combination of drive motor 4A or 4B and planetary transmission 3A or 3B without changing other components of the drive system 1. Furthermore, the planetary transmission 3A or 3B drives a differential 5, which, in turn, drives the axle 21. In particular, the differential 5 ensures that the wheels of the wheel axle are driven. A decoupling device 6 also is provided and ensures that the drive motor 4A or 4B is uncoupled from the axle if, for example, a rotational speed of the wheels exceeds a critical value.

Figure 2:
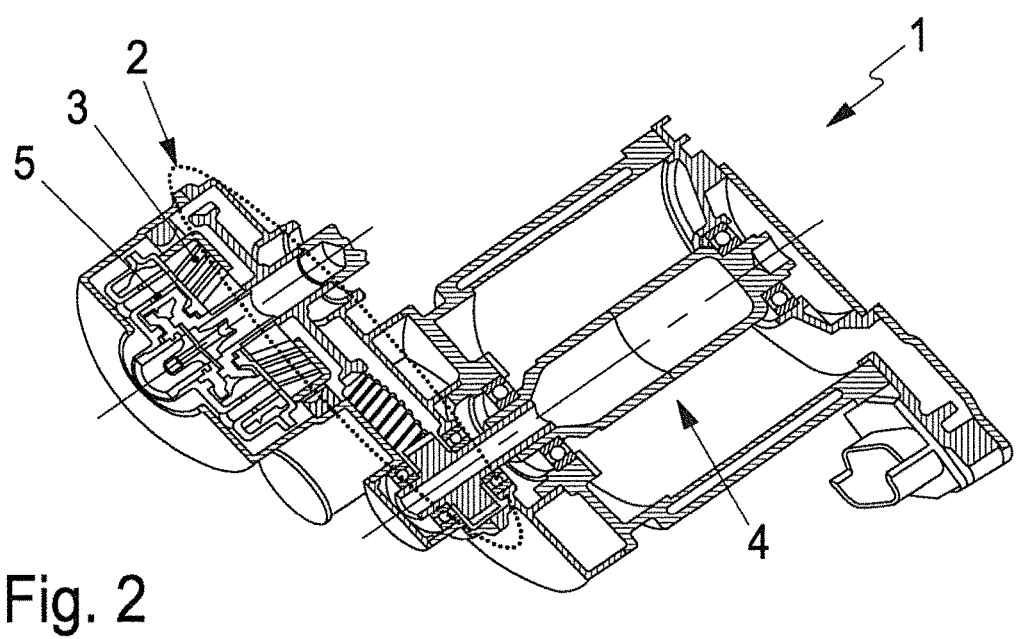
FIG. 2 is a perspective sectional view through the drive system of FIG. 1.

FIG. 2 is a perspective sectional view through the drive system 1 of FIG. 1 and provides a view into the drive motor 4, the gear chain 2, the planetary transmission 3 and the spur gear differential 5. In particular, the drive system 1, consisting of the modules, is illustrated in assembled form. Various modules preferably are enclosed by a common housing or housing part. For example, the gear chain 2 is enclosed here on one side by a housing part that also accommodates the drive motor, while the gear chain 2 is enclosed on the other side by a housing part that accommodates the planetary transmission 3 and the differential 5. Furthermore, it is conceivable that the distance between the axle 21 and the housing of the drive motor 4 is smaller than the extent of the housing in a direction running perpendicularly to the axle 21.

What is claimed is:

1. First and second drive systems provided respectively for first and second vehicles that have different power capacities, the drive systems comprising the first drive system comprising a first drive motor in a first drive motor housing; a first axle; a first gear chain disposed in a first gear chain housing that has opposite first and second sides, the first side of the first gear chain housing being connected to the first drive motor housing; and a first planetary transmission disposed in a first planetary transmission housing that is connected to the second side of the first gear chain housing, the first gear chain and the first planetary transmission being connected to one another for transmitting a driving torque generated by the first drive motor to the first axle of the first vehicle, the second drive system comprising a second drive motor in a second drive motor housing; a second axle; a second gear chain disposed in a second gear chain housing that has opposite first and second sides, the first side of the second gear chain housing being connected to the second drive motor housing; and a second planetary transmission disposed in a second planetary transmission housing that is connected to the second side of the second gear chain housing, the second gear chain and the second planetary transmission being connected to one another for transmitting a driving torque generated by the second drive motor to the second axle of the second vehicle, wherein the first axle and the second axle are identical to one another, the first gear chain and the second gear chain are identical to one another, the first gear chain housing and the second gear chain housing are identical to one another, the first drive motor and the second drive motor are different from one another in that the second drive motor has a different power capacity than the first drive motor and the first planetary transmission and the second planetary transmission are different from one another, and wherein the first planetary transmission is coordinated with the first drive motor to determine a first overall transmission ratio for the first vehicle, and the second planetary transmission is coordinated with the second drive motor to determine a second overall transmission ratio for the second vehicle.

2. The first and second drive systems of claim 1, wherein the first drive system is provided with a first differential, the driving torque being transmitted by the first planetary transmission via the first differential to the first axle, and the second drive system is provided with a second differential, the driving torque being transmitted by the second planetary transmission via the second differential to the second axle.

3. The drive systems of claim 2, wherein each of the first and second differentials is a spur gear differential.

4. The first and second drive systems of claim 1, wherein the first drive system is configured so that the first drive motor has a first drive axle aligned substantially parallel to the first axle, and the second drive system is configured so that the second drive motor has a second drive axle aligned substantially parallel to the second axle.

5. The first and second drive systems of claim 1, wherein each of the gear chains comprises an uneven number of spur gears.

6. The first and second drive systems of claim 5, wherein the first drive system is configured so that the first gear chain has a final spur gear coupled to a sun gear of the first planetary transmission, and the second drive system is configured so that the second gear chain has a final spur gear coupled to a sun gear of the second planetary transmission.

7. The first and second drive systems of claim 6, wherein each of the first and second drive systems further comprises a decoupling device.

8. The first and second drive systems of claim 6, wherein the first drive system is configured so that the first gear chain has a primary spur gear that is smaller in diameter than the final spur gear of the first gear chain, and the second drive system is configured so that the second gear chain has a primary spur gear that is smaller in diameter than the final spur gear of the second gear chain.

9. The first and second drive systems of claim 5, wherein each of the first and second gear chains comprises three spur gears having rotational axes aligned in a common plane.

10. The first and second drive systems of claim 1, wherein each of the drive motors is an electric motor.

11. First and second vehicles provided respectively with the first and second drive systems of claim 1.

* * * * *